(12) United States Patent
Arimilli et al.

(10) Patent No.: US 7,475,399 B2
(45) Date of Patent: *Jan. 6, 2009

(54) METHOD AND DATA PROCESSING SYSTEM OPTIMIZING PERFORMANCE THROUGH REPORTING OF THREAD-LEVEL HARDWARE RESOURCE UTILIZATION

(75) Inventors: Ravi Kumar Arimilli, Austin, TX (US); Randal Craig Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 993 days.

This patent is subject to a terminal disclaimer.

(21) Appl. No.: 10/755,877

(22) Filed: Jan. 13, 2004

(65) Prior Publication Data

US 2005/0154860 A1    Jul. 14, 2005

(51) Int. Cl.
*G06F 9/46* (2006.01)
*G06F 9/30* (2006.01)

(52) U.S. Cl. .................... 718/104; 718/105; 712/216

(58) Field of Classification Search ............ 718/100, 718/101, 102, 103, 104, 105; 712/216, 220
See application file for complete search history.

(56) References Cited

U.S. PATENT DOCUMENTS

| | | | | |
|---|---|---|---|---|
| 5,630,128 A * | 5/1997 | Farrell et al. | ............... | 718/103 |
| 6,026,354 A * | 2/2000 | Singh et al. | ............... | 702/186 |
| 6,487,578 B2 * | 11/2002 | Ranganathan | ............... | 718/104 |
| 6,549,930 B1 * | 4/2003 | Chrysos et al. | ............... | 718/104 |
| 6,658,654 B1 * | 12/2003 | Berry et al. | ............... | 717/131 |
| 6,918,116 B2 * | 7/2005 | Ang | ............... | 718/102 |
| 7,072,970 B2 * | 7/2006 | Georgiou et al. | ............... | 709/230 |
| 7,191,440 B2 * | 3/2007 | Cota-Robles et al. | ............... | 718/1 |

* cited by examiner

*Primary Examiner*—Thomas Lee
*Assistant Examiner*—Abdullah Al Kawsar
(74) *Attorney, Agent, or Firm*—Casimer K. Salys; Dillon & Yudell LLP

(57) ABSTRACT

According to a method of operating a data processing system, one or more monitoring parameter sets are established in a processing unit within the data processing system. The processing unit monitors, in hardware, execution of each of a plurality of schedulable software entities within the processing unit in accordance with a monitoring parameter set among the one or more monitoring parameter sets. The processing unit then reports to software executing in the data processing system utilization of hardware resources by each of the plurality of schedulable software entities. The hardware utilization information reported by the processing unit may be stored and utilized by software to schedulable execution of the schedulable software entities reported by the processing unit. The hardware utilization information may also be utilized to generate a classification of at least one executing schedulable software entity, which may be communicated to the processing unit to dynamically modify an allocation of hardware resources to the schedulable software entity.

16 Claims, 5 Drawing Sheets

METHOD AND DATA PROCESSING SYSTEM OPTIMIZING PERFORMANCE THROUGH REPORTING OF THREAD-LEVEL HARDWARE RESOURCE UTILIZATION

CROSS-REFERENCE TO RELATED APPLICATION

The present application is related to U.S. patent application Ser. No. 10/755,878; which is filed on even date herewith, assigned to the assignee of the present application, and incorporated herein by reference in its entirety.

BACKGROUND OF THE INVENTION

1. Technical Field

The present invention relates in general to data processing, and in particular, to performance optimization within a data processing system. Still more particularly, the present invention relates to a data processing system and method in which hardware and software coordinate to optimize processing of threads.

2. Description of the Related Art

A number of trends currently influence the development of server-class and mainframe computer systems. In particular, transistor densities within integrated circuits continue to increase according to Moore's Law, which in its current formulation posits that the number of transistors per unit area on integrated circuits will double approximately every 18 months. In addition, processor frequencies continue to double approximately every 2 years. Furthermore, system scale (i.e., the number of central processing units (CPUs) in the system) continues to grow to tens, hundreds, and in some cases, even thousands of processors. The result of these trends is that peak performance of server-class and mainframe computer systems has escalated rapidly, with recently developed large-scale high performance computing (HPC) systems boasting peak performance figures of 100 TFLOPS (100 trillion floating-point operations per second) or more.

Unfortunately, sustained performance in high performance computing systems has not improved at the pace of peak performance, and in fact, the ratio of sustained performance to peak performance while presently low (e.g., 1:10) is declining. With such unutilized computational capacity available, significant attention is now being devoted to achieving greater sustained performance. One object of this focus is the allocation of system resources, such as CPUs, memory, I/O bandwidth, disk storage, etc., to the various workloads to be accomplished. In conventional multiprocessor data processing systems, the allocation of system resources to workloads is handled by two distinct operating system (OS) components: the scheduler and the workload manager (WLM).

The scheduler is a component of the operating system kernel that is responsible for scheduling execution of schedulable software entities, often referred to as "threads," on the various CPUs within the data processing system. To perform the scheduling function, a typical scheduler establishes a global queue from which threads may be scheduled and a number of distributed run queues that are each associated with a respective processing unit. The scheduler assigns threads to run queues based upon a scheduling policy that takes into consideration, for example, thread priorities and the affinity of threads to the system resources (e.g., system memory, data, I/O resources, caches, execution resources, etc.) required to execute the threads.

The WLM further facilitates the efficient use of system resources by re-allocating the workload among various OS partitions and hardware nodes. For example, the OS/390 operating system available from International Business Machines (IBM) Corporation of Armonk, N.Y. includes a WLM that balances workloads among various operating system partitions in accordance with user-specified business-oriented goals, such as transaction response times and batch run times for critical batch jobs. Such workload balancing generally entails a great deal of software performance monitoring to gather information regarding resource usage and performance in each OS partition. Utilizing this performance information, the WLM can then manage thread dispatch priorities and the use of memory and other resources to attempt to achieve the user-specified objectives for all of the current workloads.

SUMMARY OF THE INVENTION

The present invention recognizes that the performance optimizations achieved through conventional OS schedulers and WLMs, while certainly resulting in performance improvements, optimize only to a certain level of granularity. That is, because schedulers and WLMs are software components, the optimizations achieved by these components tend to address high-level performance issues that can readily be monitored by software. As such, low-level performance issues, such as hardware allocation of shared resources among multiple threads, are not addressed by conventional software-only techniques of performance optimization.

For example, work is frequently presented to a conventional multiprocessor computer system as a sequence of "jobs" that each consist of a number of (possibly) interdependent processes. The jobs are generally processed sequentially, meaning that a next process is not initiated until all processes within the previous job have completed execution. Thus, job execution time is determined by the last process to complete. In this type of execution environment, conventional OS schedulers and WLMs can optimize the overall execution of individual processes, for example, by dispatching processes to processors having spatial affinity to data and other required resources. However, conventional OS schedulers and WLMs do not implement fine-grained optimization of the execution of process threads in accordance with the time-varying behavior of the threads. For example, the OS scheduler and WLM typically do not take into consideration the demands for different resources (e.g., I/O channels, system interconnect, memory controller, and floating point unit) predominating during different phases of thread execution in suspending, interrupting, scheduling, and moving process threads between processors.

In view of the foregoing, the present invention provides an improved method and data processing system for optimizing the performance of a data processing system in which software, such as an operating system, and processing hardware collaborate to optimize performance of threads. According to one embodiment, one or more monitoring parameter sets are established in a processing unit within the data processing system. The processing unit monitors, in hardware, execution of each of a plurality of schedulable software entities within the processing unit in accordance with a monitoring parameter set among the one or more monitoring parameter sets. The processing unit then reports to software executing in the data processing system utilization of hardware resources by each of the plurality of schedulable software entities. The hardware utilization information reported by the processing unit may be stored and utilized by software to schedulable execution of the schedulable software entities reported by the processing unit. The hardware utilization information may also be utilized to generate a classification of at least one executing schedulable software entity, which may be communicated to the processing unit to dynamically modify an allocation of hardware resources to the schedulable software entity.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
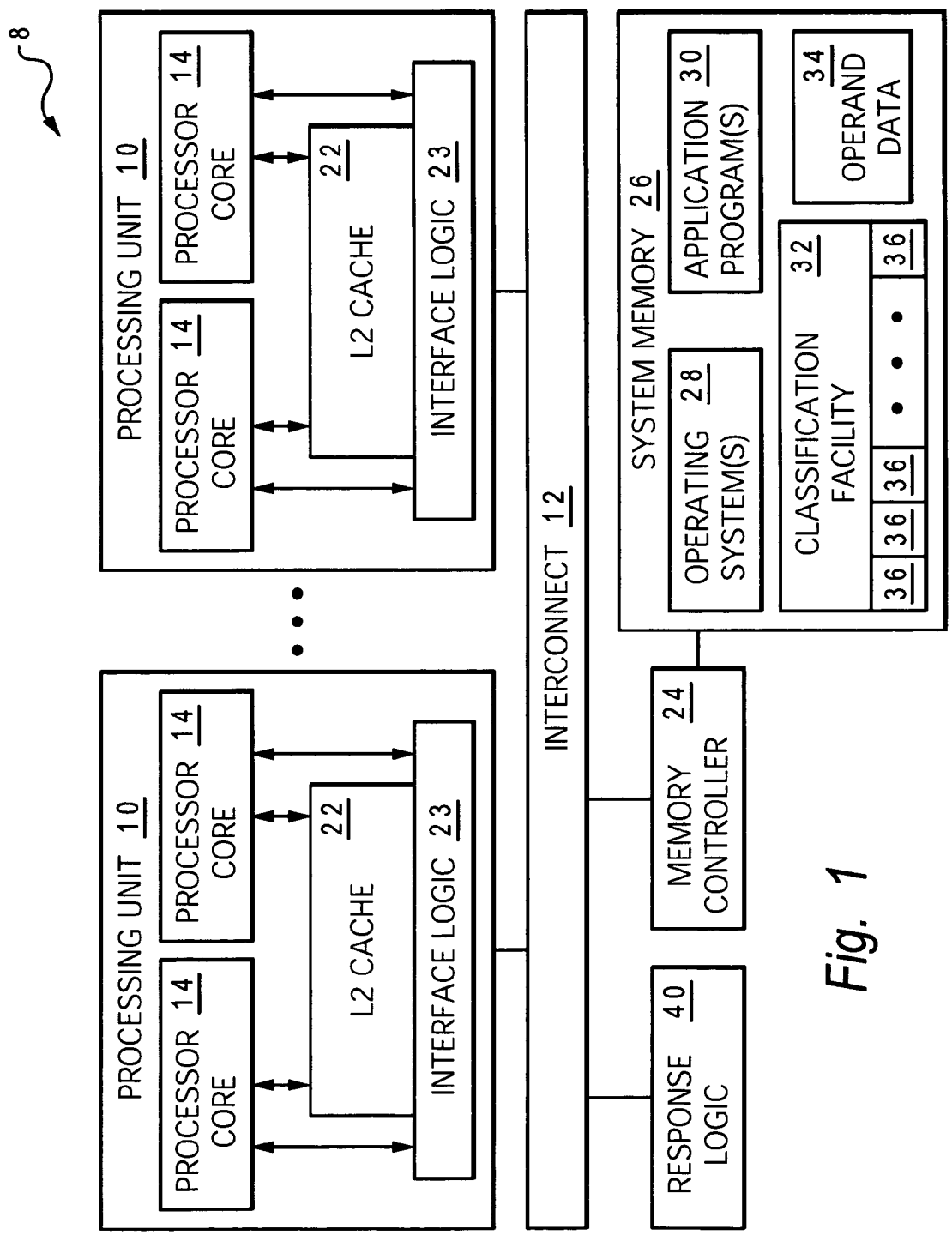
FIG. 1 is a high level block diagram of an exemplary multiprocessor data processing system in accordance with the present invention.

With reference now to the figures and in particular with reference to FIG. 1, there is illustrated a high-level block diagram of a multiprocessor (MP) data processing system that provides improved performance optimization in accordance with one embodiment of the present invention. As depicted, data processing system 8 includes multiple (e.g., 8, 16, 64 or more) processing units 10 coupled for communication by a system interconnect 12. Each processing unit 10 is a single integrated circuit including interface logic 23 and one or more processor cores 14.

As further illustrated in FIG. 1, the memory hierarchy of data processing system 8 includes one or more system memories 26, which form the lowest level of volatile data storage in the memory hierarchy, and one or more levels of cache memory, such as on-chip level two (L2) caches 22, which are utilized to stage instructions and operand data from system memory 26 to processor cores 14. As understood by those skilled in the art, each succeeding lower level of the memory hierarchy is typically capable of storing a larger amount of data than higher levels, but at higher access latency with respect to processor cores 14.

As shown, system memory 26, which is interfaced to interconnect 12 by memory controller 24, may store operand data 34 and portions of one or more operating systems 28 and one or more application programs 30. In addition, system memory 26 may include a classification facility 32 allocated (e.g., at boot time) by operating system(s) 28. Although illustrated as a facility within system memory, those skilled in the art will appreciate that classification facility 32 may alternatively be implemented within another component of data processing system 8.

Classification facility 32 includes a number (e.g., 1024) of individual classification fields 36 that can each be utilized to store classification information pertaining to a respective thread of execution. As described further below, the classification information can be utilized to dynamically optimize execution of data processing system 8.

System interconnect 12, which can comprise one or more buses, a switch fabric, or other interconnect architecture, serves as a conduit for communication among the devices (e.g., processing units 10, memory controller 24, etc.) coupled to system interconnect 12. A typical transaction on system interconnect 12 begins with a request, which may include a transaction field indicating the type of transaction, one or more tags indicating the source and/or intended recipient(s) of the transaction, and an address and/or data. Each device connected to system interconnect 12 preferably snoops all relevant transactions on system interconnect 12 and, if appropriate, responds to the request with a snoop response. Such snoop responses are received and compiled by response logic 40, which provides a collective combined response indicating what action, if any, each snooper is to take in response to the request. These actions may include sourcing data on system interconnect 12, storing data provided by the requesting snooper, invalidating cached data, etc. Although illustrated separately, it should be understood that response logic 40 may alternatively be incorporated within a particular device (e.g., memory controller 24) or may be distributed among various devices (e.g., processing units 10) such that different devices (e.g., the masters of each transaction) compile the snoop responses to produce the combined response for different transactions.

Those skilled in the art will appreciate that data processing system 8 can include many additional unillustrated components, such as I/O adapters, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to MP data processing systems of any architecture and are in no way limited to the generalized MP architecture illustrated in FIG. 1.

Figure 2:
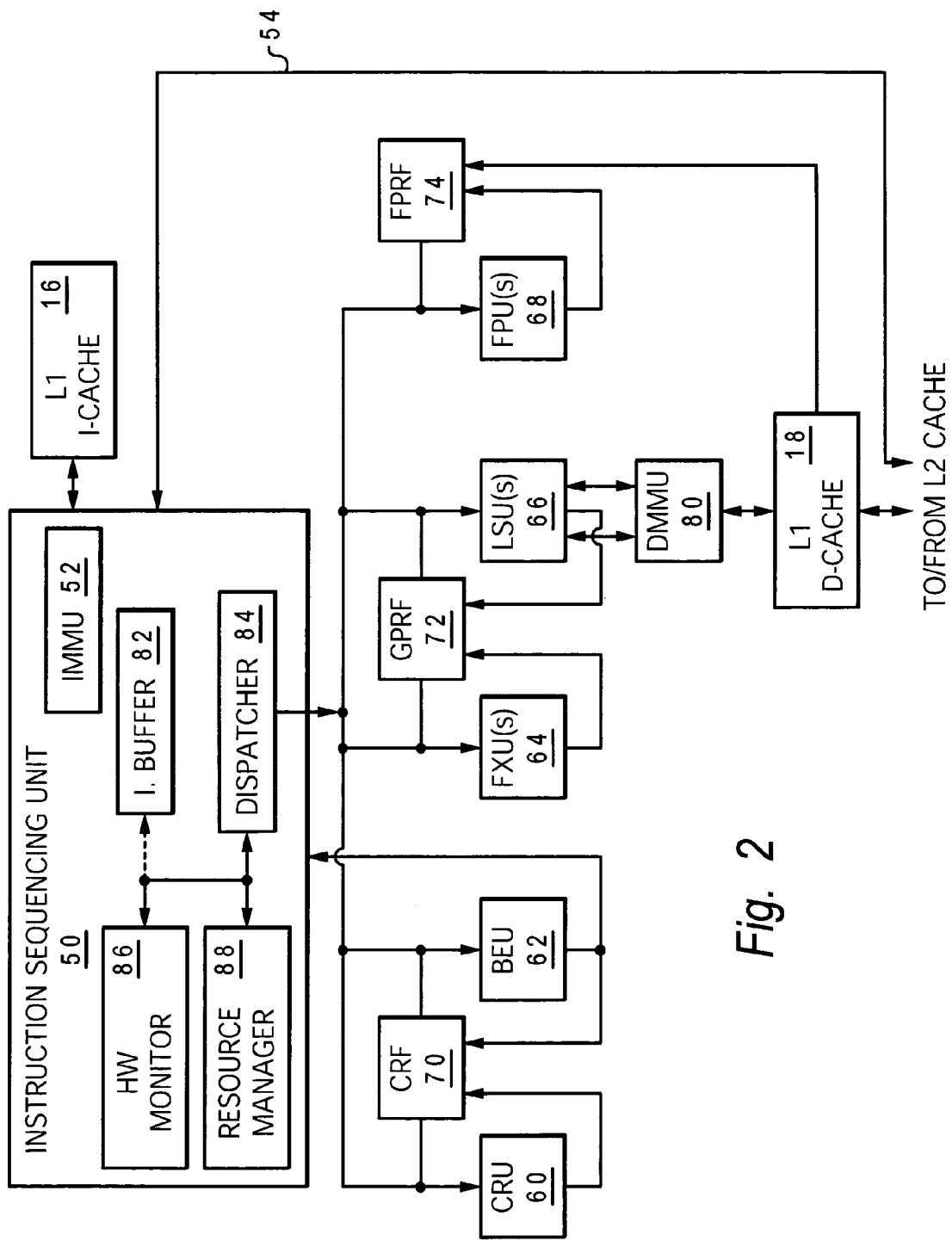
FIG. 2 depicts a more detailed block diagram of an exemplary processing unit within the data processing system illustrated in FIG. 1.

Referring now to FIG. 2, there is depicted a more detailed block diagram of an exemplary embodiment of a processor core 14 in accordance with the present invention. As shown, each of processor cores 14 includes associated level one (L1) instruction and data caches 16 and 18, which temporarily buffer instructions and operand data, respectively, that are likely to be accessed by processor core 14. L2 cache 22 may be inclusive, non-inclusive, or partially inclusive of the contents of L1 caches 16 and 18, as is known in the art.

In addition, processor core 14 has an instruction sequencing unit (ISU) 50 that fetches instructions from L1 I-cache 16 utilizing real addresses obtained by the effective-to-real address translation (ERAT) performed by instruction memory management unit (IMMU) 52. As will be appreciated by those skilled in the art, ISU 50 may demand fetch (i.e., non-speculatively fetch) instructions within one or more active threads of execution, or speculatively fetch instructions that may or may not ultimately be executed. In either case, if a requested cache line of instructions does not reside in L1

I-cache 16, then ISU 50 requests the relevant cache line of instructions from L2 cache 22 (and/or lower level memory) via I-cache reload bus 54.

Instructions fetched by ISU 50 are initially buffered within instruction buffer 82. While buffered within instruction buffer 82, the instructions may be pre-processed, for example, to perform branch prediction or to translate the instructions utilizing microcode. The instructions within instruction buffer 82 may optionally be further processed by hardware (HW) monitor 86, as discussed further below, in order to classify the thread of execution to which the instructions belong.

Figure 3B:
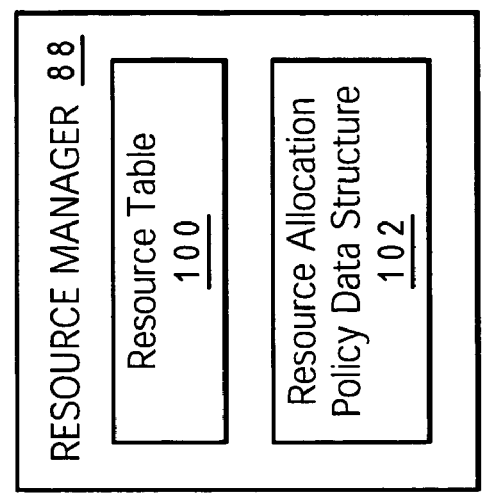
FIG. 3B is a more detailed block diagram of an exemplary embodiment of the resource manager of FIG. 2 in accordance with the present invention.
Figure 3A:
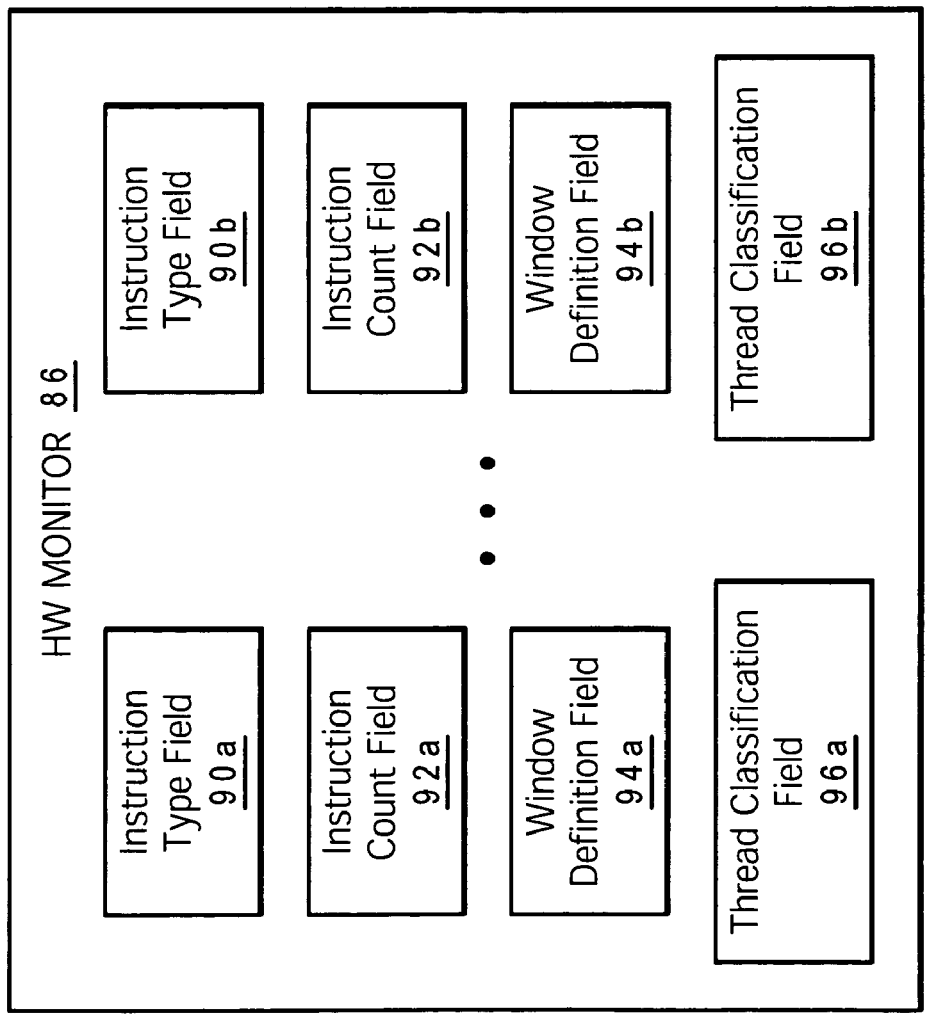
FIG. 3A is a more detailed block diagram of an exemplary embodiment of the hardware monitor of FIG. 2 in accordance with the present invention.

As illustrated in FIG. 3A, in one illustrative embodiment, hardware monitor 86 contains a number of fields 90, 92, and 94 for storing the monitoring parameters of each thread that may be concurrently executed by process core 14 by simultaneous multithreading (SMT). Thus, fields 90a, 92a and 94a define monitoring parameters for a first thread, fields 90b, 92b and 94b define monitoring parameters for a second concurrently executed thread within processor core 14, and so on.

In the illustrative embodiment, instruction type fields 90a, 90b store an indication of a particular opcode or group of opcodes to be detected within a respective associated thread by hardware monitor 86 of ISU 50. Depending upon the desired implementation, hardware monitor 86 can be configured to detect instructions satisfying the criteria within instruction type fields 90a, 90b while the instructions are buffered within instruction buffer 82 or as the instructions are dispatched for execution by dispatcher 84. Instruction count fields 92a, 92b further specify a number of instructions satisfying the criterion in the respective instruction type field 90 to be detected within a window of consecutive instructions in the thread. The size of the window of consecutive instructions is defined by the associated one of window definition fields 94a, 94b. A thread classification obtained through monitoring execution of the thread may be stored within the appropriate one of thread classification fields 96a, 96b.

ISU 50 of FIG. 2 further includes a resource manager 88 that tracks and manages the allocation and availability of at least the resources (e.g., execution units, rename and architected registers, cache lines, etc.) within processing core 14. As illustrated in FIG. 3B, resource manager 88 includes a resource table 100 that preferably tracks the allocation of resources not only with respect to individual instructions (in order to allocate to instructions the execution unit and registers required for their execution), but also, in embodiments in which SMT is supported, with respect to particular threads. Resource manager 88 further includes resource allocation policy data structure 102 that stores rules defining a dynamically alterable policy that governs the allocation of at least the resources within processor core 14 by resource manager 88 based upon the classification of threads contained in thread classification fields 96. Thus, for example, resource allocation policy data structure 102 may store rules specifying that resource manager 88 should allocate 30% of execution time in a particular execution unit to a first thread, and allocate 70% of execution time in that execution unit to a second thread based upon the classifications of the threads with respect to the execution unit resource. In one preferred embodiment, a human system administrator can access a software facility of an operating system 28 or hypervisor 110 to load a desired rule set into policy data structure 102 that optimizes execution of a particular type of workload (e.g., scientific or commercial).

As resource manager 88 allocates resources needed by particular instructions buffered within instruction buffer 82 by reference to resource table 100, dispatcher 84 within ISU 50 dispatches the instructions from instruction buffer 82 to execution units 60-68, possibly out-of-program-order, based upon instruction type. Thus, condition-register-modifying instructions and branch instructions are dispatched to condition register unit (CRU) 60 and branch execution unit (BEU) 62, respectively, fixed-point and load/store instructions are dispatched to fixed-point unit(s) (FXUs) 64 and load-store unit(s) (LSUs) 66, respectively, and floating-point instructions are dispatched to floating-point unit(s) (FPUs) 68. After possible queuing and buffering, the dispatched instructions are executed opportunistically by execution units 60-68.

During execution within one of execution units 60-68, an instruction may receive input operands, if any, from one or more architected and/or rename registers within a register file 70-74 coupled to the execution unit. Data results of instruction execution (i.e., destination operands), if any, are similarly written to register files 70-74 by execution units 60-68. For example, FXU 64 receives input operands from and stores destination operands to general-purpose register file (GPRF) 72, FPU 68 receives input operands from and stores destination operands to floating-point register file (FPRF) 74, and LSU 66 receives input operands from GPRF 72 and causes data to be transferred between L1 D-cache 18 and both GPRF 72 and FPRF 74. Similarly, when executing condition-register-modifying or condition-register-dependent instructions, CRU 60 and BEU 62 access control register file (CRF) 70, which in a preferred embodiment contains a condition register, link register, count register and rename registers of each. BEU 62 accesses the values of the condition, link and count registers to resolve conditional branches to obtain a path address, which BEU 62 supplies to instruction sequencing unit 50 to initiate instruction fetching along the indicated path. After an execution unit finishes execution of an instruction, the execution unit notifies ISU 50, which schedules completion of instructions in program order. Resource manager 88 also updates resource table 100 to reflect the release of the resources allocated to the completed instructions.

Figure 4:
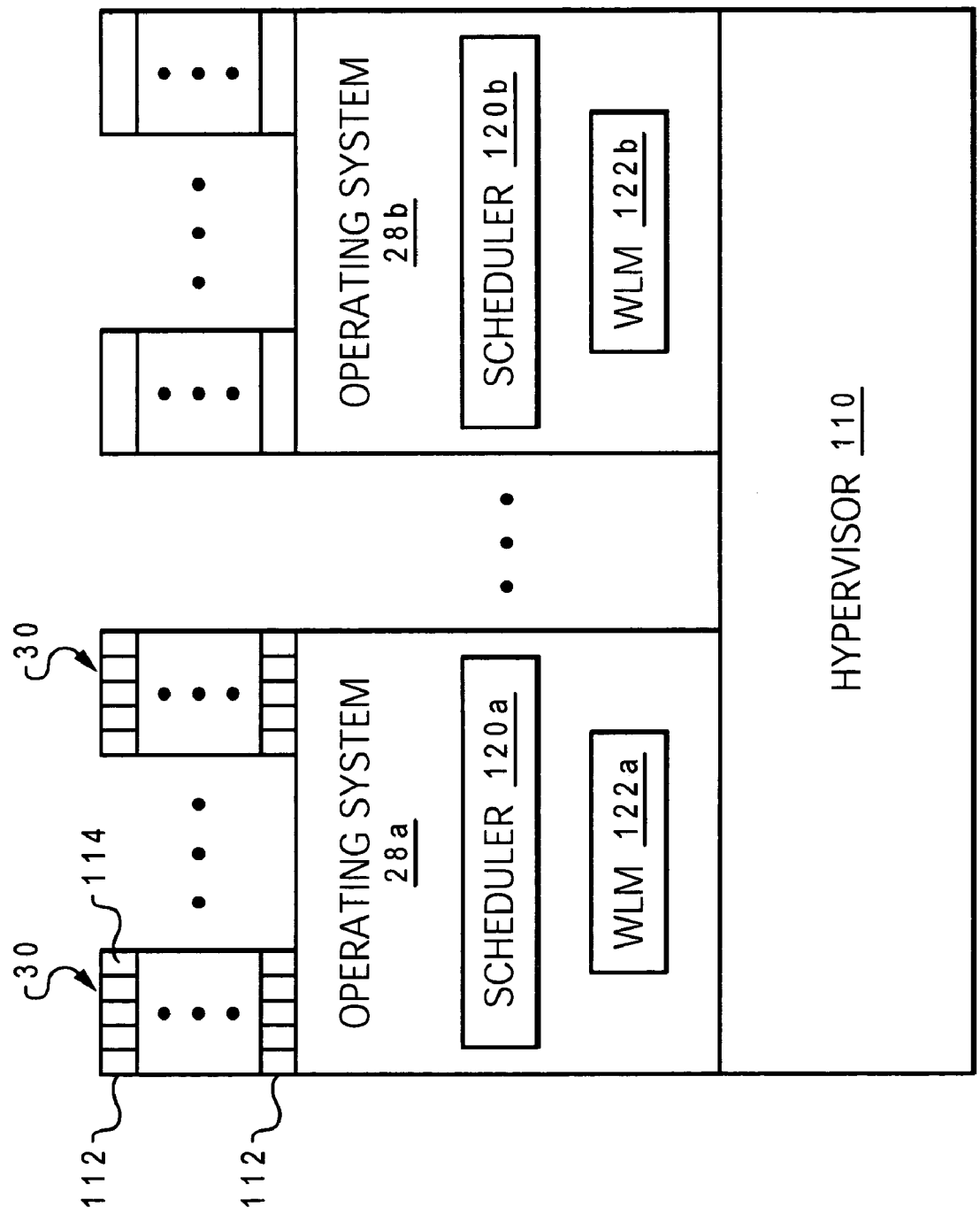
FIG. 4 is a software layer diagram illustrating an exemplary software configuration of the data processing system of FIG. 1 in accordance with the present invention.

Referring now to FIG. 4, there is illustrated a software layer diagram of an exemplary software configuration of data processing system 8 of FIG. 1. As illustrated, the software configuration has at its lowest level an operating system supervisor (or hypervisor) 110 that allocates system resources among one or more operating systems 28 concurrently executing within data processing system 8. The resources allocated to each instance of an operating system 28 are referred to as a partition. Thus, for example, hypervisor 110 may allocate two processing units 10 to the partition of operating system 28a, four processing units 10 to the partition of operating system 28b, and certain ranges of real and effective address spaces to each partition.

Running above hypervisor 110 are operating systems 28a, 28b and application programs 30. As well understood by those skilled in the art, each operating system 28 allocates resources from the pool of resources allocated to it by hypervisor 110 to various operating system processes and applications 30, independently controls the operation of the hardware allocated to its partition, and provides various application programming interfaces (API) through which operating system services can be accessed by its application programs 30. As described briefly above, operating systems 28 include a scheduler 120 that schedules threads to the processor cores 14 in its partition, and may further include a workload manager (WLM) 122 to optimize the distribution of work and associated data within the partition.

Application programs 30, which can be programmed to perform any of a wide variety of computational, control, communication, data management and presentation functions, comprise a number of user-level processes 112. As with operating system processes, each of these user-level processes 112 may comprise one or more threads 114, which as defined herein, are the software entities that are scheduled by the underlying operating system 28.

In accordance with the present invention, performance optimization within data processing system 8 is improved by coordinating the optimization efforts of software and hardware. In particular, hardware, for example, hardware monitor 86 of ISU 50, monitors instructions belonging to the thread(s) processed within a processor core 14. The information gathered by the hardware is reported to software, such as an operating system 28. The software and/or the hardware then classify the thread(s) of execution and establish a resource allocation policy that optimizes performance based upon the time-varying classification of the thread(s).

Figure 5:
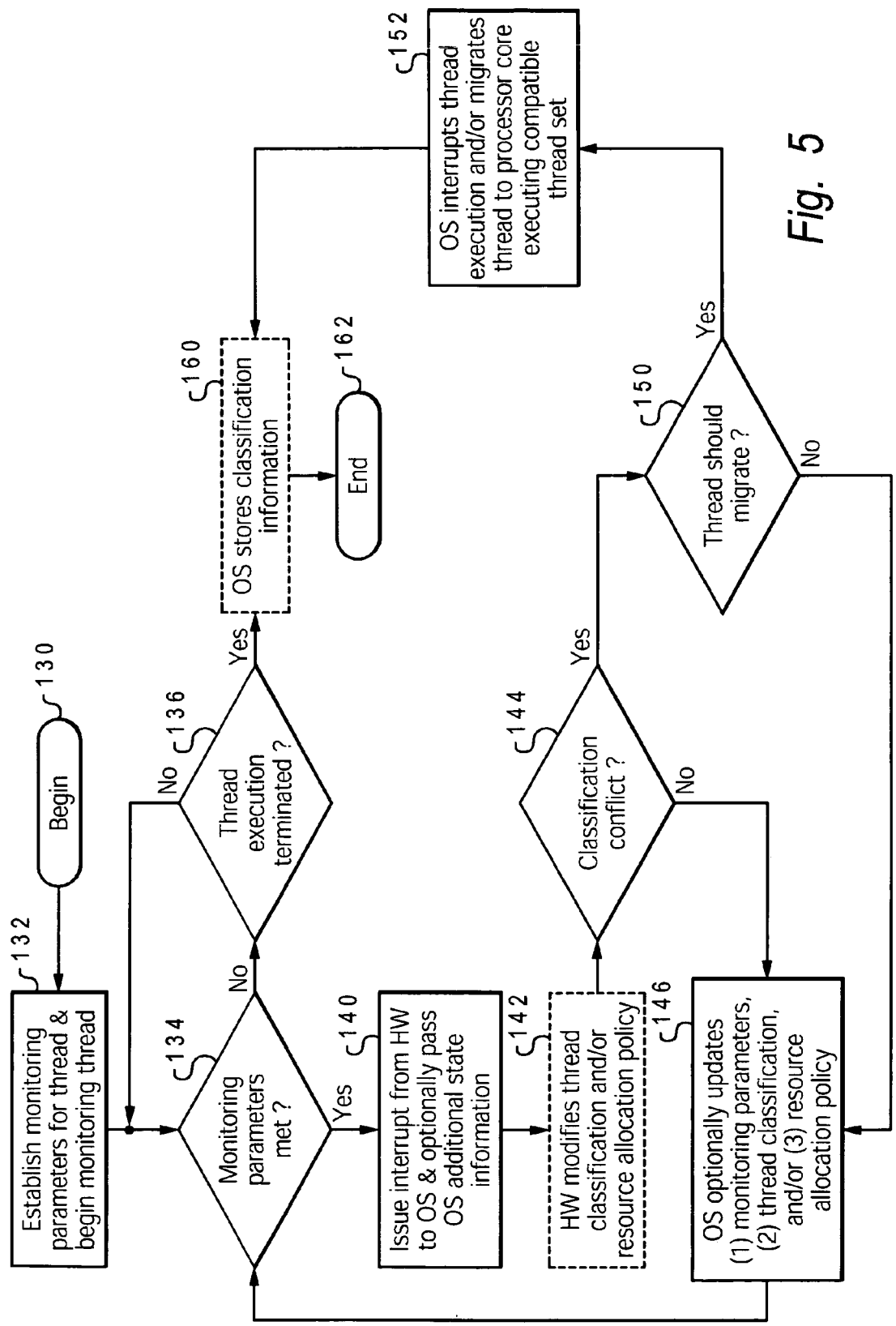
FIG. 5 is a high level logical flowchart of an exemplary method of thread performance optimization employing communication between processing hardware and software in accordance with the present invention.

With reference now to FIG. 5, there is illustrated a high level logical flowchart of an exemplary process by which data processing system 8 dynamically optimizes the performance of a thread in accordance with one embodiment of the present invention. The illustrated process is individually performed for each thread concurrently executed by data processing system 8.

As illustrated, the process begins at block 130, which represents the scheduler of an operating system 28 scheduling a thread on a processor core 14 within its partition. The operating system scheduler may schedule the thread in accordance with conventional scheduling policy based, for example, on a relative priority of the thread with respect to other runnable threads, the affinity of the selected thread, and/or other factors. Next, as depicted at block 132, the hardware monitor 86 within the processor core 14 establishes monitoring parameters that govern the criterion or criteria by which the thread will be monitored, and begins monitoring execution of the thread by processor core 14 in accordance with the monitoring parameters. The monitoring parameters for the current thread can be established, for example, by hardware defaults, by the operating system loader when the operating system 28 on which the thread will execute is loaded, by simply retaining the monitoring parameters of the previously executed thread, or by the operating system 28 in conjunction with scheduling the thread. In one embodiment, the operating system 28, the operating system loader, or other software may write the monitoring parameters of the thread into fields 90, 92 and 94, which may be directly accessed as memory-mapped storage locations.

Returning to FIG. 5, hardware monitor 86 next determines at block 134 whether or not the monitoring parameters established at block 132 have been satisfied by the current thread. For example, hardware monitor 86 may determine at block 134 if the number of instructions indicated in the relevant instruction count field 92 that are of the type specified within the relevant instruction type field 90 have been detected within an instruction window of the size indicated in window definition field 94. It should be appreciated that hardware monitor 86 may additionally determine at block 134, whether the three criteria contained in fields 90, 92 and 94 have been jointly satisfied a selected number of times.

As indicated by block 136, the monitoring process illustrated at block 134 continues until the thread terminates execution or the monitoring parameters specified within fields 90-94 are satisfied. If the thread terminates execution, the process passes from block 136 to block 160, which is described below. If, however, hardware monitor 86 determines at block 134 that the monitoring parameters specified within fields 90-94 have been satisfied, hardware monitor 86 issues an interrupt to the underlying operating system 28 at block 140. The interrupt primarily informs the operating system 28 that the monitoring parameters have been satisfied by the current thread, but may also provide further state information to the operating system 28, such as the thread ID, the contents of the fields 90-94 assigned to the thread, resource utilization information (e.g., instruction counts by instruction type, cache utilization, and/or snoop information), etc.

As further illustrated at block 142, in response to determining at block 134 that the hardware monitoring parameters are satisfied, hardware, such as hardware monitor 86, may optionally modify a classification of the thread stored within thread classification field 96 and/or the resource allocation policy contained in resource allocation policy field 102. For example, if fields 90-94 define monitoring parameters according to which hardware monitor 86 counts a certain number of floating-point instructions in a thread within a given instruction window, hardware monitor 86 may update the relevant thread classification field 96 to indicate that the thread is a floating-point-dominant thread. By virtue of this classification update, resource manager 88 will automatically modify the allocation of resources to the thread (and hence update resource table 100) by application of the resource allocation policy within resource allocation policy data structure 102 to the new thread classification. For example, in response to the new thread classification, the resource allocation policy within resource allocation policy data structure 102 may cause resource manager 88 to attempt to allocate additional execution slots within FPU(s) 68 to the current thread.

In response to receipt of the hardware interrupt generated by hardware monitor 86, the operating system 28 on which the thread is running determines at block 144 whether or not the hardware interrupt indicates that a known classification conflict exists between different threads concurrently executing on the processor core 14. A classification conflict may exist, for example, if a greater number of threads have the same or similar classification than can efficiently be executed concurrently by the processor core 14, given the finite resource set of the processor core 14. If operating system 28 determines at block 144 that no classification conflict exists for the current thread, the process proceeds from block 144 to block 146, which is described below. If, however, operating system 28 determines at block 144 that a classification conflict exists for the current thread, the operating system 28 makes a further determination at block 150 whether or not to migrate the thread. This determination may take into consideration, for example, whether a processor core is available that would not a have a classification conflict with the current thread, given its current thread set and resource set. The determination shown at block 150 may further take into consideration the availability of a different runnable thread of sufficient priority and proper classification that may be run in place of the current thread and that will reduce or eliminate the classification conflict. If the operating system 28 makes a determination at block 150 that the current thread should not be migrated, the process proceeds to block 146, which is described below. If, however, operating system 28 makes a determination that the current thread should be migrated to resolve the classification conflict, the process passes to block 152.

Block 152 depicts the operating system 28 migrating the current thread to a different processor core 14, possibly after interrupting or suspending the execution of the thread for some period of time before rescheduling the thread for execution. As shown at block 160, the operating system 28 may also optionally store the current and/or historical classification(s) of the thread obtained from the relevant thread classification field 96 of hardware monitor 86 within a field 36 of classification facility 32 in system memory 26. In this manner, the operating system 28 can appropriately initialize the thread classification field 96 and/or monitoring parameters for the thread to optimize subsequent execution. If multiple classifications are stored for a particular thread in classification facility 32, each such thread classification is preferably stored in association with a label, such as an instruction pointer, that facilitates identification of the relevant thread classification for a particular section of the thread. Following block 160, the process shown in FIG. 5 terminates at block 162.

Returning to block 146, in response to a determination by the operating system 28 that no classification conflict does not exist between the current thread and another thread concurrently executing within the same processor core 14 or that the current process should not be migrated, the operating system 28 optionally updates the hardware within processor core 14 in order to facilitate optimization of the processing of the current thread. For example, the operating system 28 may update the monitoring parameters contained in the relevant fields 90-94 in order to gather additional information needed to further refine the classification within thread classification field 96. In addition, the operating system 28 may directly update the classification of the current thread by writing the appropriate thread classification field 96. The operating system 28 may alternatively or additionally modify the resource allocation policy within resource allocation policy data structure 102 in order to better optimize thread processing given the current distribution of thread classifications within the current processor core 14. Following block 146, the process illustrated in FIG. 5 returns to block 134, which has been described.

The exemplary process shown in FIG. 5 provides a number of advantages over conventional optimization techniques. First, because thread monitoring is implemented in hardware, detailed, thread-specific, time-varying classification information is available for use by both the hardware resource manager and the software scheduling and workload management routines, supporting finer-grained optimizations. Second, because the process shown in FIG. 5 iterates during thread processing, a single thread may be classified differently at different points during its execution, depending upon the selected monitoring parameters and the time-varying behavior of the thread. Third, an operating system can more intelligently determine whether or not to migrate the various threads within its partition based upon not only resource affinity, but also hardware-supplied thread classifications.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively or additionally be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of operating a data processing system, said method comprising:

establishing one or more monitoring parameter sets in an integrated circuit processing unit within the data processing system, wherein the one or more monitoring parameter sets indicate one or more criteria by which a plurality of schedulable software entities will be monitored;

the integrated circuit processing unit concurrently executing instructions within a first schedulable software entity and a second schedulable software entity among the plurality of schedulable software entities;

the integrated circuit processing unit monitoring, in hardware, execution of the first and second schedulable software entities within the integrated circuit processing unit in accordance with a monitoring parameter set among the one or more monitoring parameter sets;

the integrated circuit processing unit reporting to management software executing in the data processing system utilization of hardware resources of the data processing system by each of the first and second schedulable software entities;

the management software generating a respective classification of each of the first and second schedulable software entities;

the management software communicating the classifications to the integrated circuit processing unit and storing the classifications in classification storage in the integrated circuit processing unit in association with identifiers of the respective schedulable software entities; and in response to receipt of at least a classification of the first schedulable software entity by the integrated circuit processing unit, the integrated circuit processing unit dynamically modifying an allocation of hardware resources of the data processing system to the first schedulable software entity, wherein the modifying includes increasing an allocation to said second schedulable software entity of a hardware resource shared by said first and said second schedulable software entities.

2. The method of claim 1, wherein said establishing a monitoring parameter set comprises the integrated circuit processing unit receiving said monitoring parameter set from said management software and storing said monitoring parameter set in said integrated circuit processing unit.

3. The method of claim 1, wherein said reporting comprises said integrated circuit processing unit interrupting said management software.

4. The method of claim 1, wherein establishing a monitoring parameter set comprises receiving, from software, information identifying an instruction type to be detected when processed by the integrated circuit processing unit and a number of instructions to be detected of the instruction type.

5. The method of claim 1, wherein:

the management software comprises an operating system;

the method further comprises the operating system scheduling one or more schedulable software entities for execution within the integrated circuit processing unit in accordance with the utilization of hardware resources by each of the plurality of schedulable software entities reported by the integrated circuit processing unit.

6. The method of claim 1, wherein:

the management software comprises an operating system; and the method further comprises the operating system scheduling the one more schedulable software entities by reference to the stored classifications.

7. A data processing system, comprising:

data storage;

one or more integrated circuit processing units coupled to said data storage, wherein an integrated circuit processing unit among said one or more integrated circuit processing units includes:

one or more execution units that execute instructions;

instruction fetch and dispatch circuitry that supplies instructions to said one or more execution units for execution;

classification storage;

storage for one or more monitoring parameter sets that indicate one or more criteria by which software entities will be monitored;

a hardware monitor that, responsive to the one or more monitoring parameter sets, monitors, in hardware, execution of each of a plurality of schedulable software entities within the integrated circuit processing unit in accordance with a monitoring parameter set among the one or more monitoring parameter sets and reports utilization of hardware resources of the data processing system by each of the plurality of schedulable software entities; and management software within the data storage that receives reports of utilization of hardware resources from the hardware monitor, that generates a respective classification of each of the plurality of schedulable software entities, and that stores the classifications in the classification storage in association with identifiers of the respective schedulable software entities;

wherein the integrated circuit processing unit includes a resource manager that, responsive to receipt of the classification by the integrated circuit processing unit, dynamically modifies an allocation of hardware resources of the data processing system by increasing an allocation to a second schedulable software entity of a hardware resource shared by an executing first schedulable software entity and said second schedulable software entities.

8. The data processing system of claim 7, wherein the hardware monitor stores at least one monitoring parameter set within the storage for the one or more monitoring parameter sets in response to receipt of said monitoring parameter set from said management software.

9. The data processing system of claim 7, wherein said hardware monitor reports said utilization of hardware resources by interrupting said management software.

10. The data processing system of claim 7, wherein at least one of said one or more monitoring parameter sets comprises information identifying an instruction type to be detected when processed by the integrated circuit processing unit and a number of instructions to be detected of the instruction type.

11. The data processing system of claim 7, wherein:

the management software includes an operating system;

said data processing system further includes the operating system within the data storage; and the operating system schedules one or more schedulable software entities for execution within the integrated circuit processing unit in accordance with the utilization of hardware resources by each of the plurality of schedulable software entities reported by the integrated circuit processing unit.

12. The data processing system of claim 7, wherein:

the management software comprises an operating system; and the operating system schedules the one more schedulable software entities by reference to the stored classifications.

13. An integrated circuit processing unit for a data processing system, said integrated circuit processing unit comprising:

one or more execution units that execute instructions;

instruction fetch and dispatch circuitry that supplies instructions to said one or more execution units for execution;

classification storage for storing classifications of a plurality of schedulable software entities;

storage for one or more monitoring parameter sets that indicate one or more criteria by which software entities will be monitored;

a hardware monitor that, responsive to the one or more monitoring parameter sets, monitors, in hardware, execution of each of the plurality of schedulable software entities within the integrated circuit processing unit in accordance with a monitoring parameter set among the one or more monitoring parameter sets and reports to management software executing in the data processing system utilization of hardware resources of the data processing system by each of the plurality of schedulable software entities; and a resource manager that, responsive to a classification by the management software, dynamically modifies an allocation of hardware resources of the data processing system by increasing an allocation to a second schedulable software entity of a hardware resource shared by an executing first schedulable software entity and said second schedulable software entities.

14. The integrated circuit processing unit of claim 13, wherein hardware monitor stores at least one monitoring parameter set within the storage for the one or more monitoring parameter sets in response to receipt of said monitoring parameter set from said management software.

15. The integrated circuit processing unit of claim 13, wherein said hardware monitor reports said utilization of hardware resources by interrupting said management software.

16. The integrated circuit processing unit of claim 13, wherein at least one of said one or more monitoring parameter sets comprises information identifying an instruction type to be detected when processed by the integrated circuit processing unit and a number of instructions to be detected of the instruction type.

* * * * *